US012686185B2

(12) United States Patent  
Grimshaw et al.

(10) Patent No.: US 12,686,185 B2  
(45) Date of Patent: Jul. 21, 2026

(54) FIBER PLACEMENT MACHINE WITH COMPOSITE TAPE FILM REMOVAL

(71) Applicant: Fives Machining Systems, Inc., Fond du Lac, WI (US)

(72) Inventors: Michael N. Grimshaw, Milford, OH (US); Thomas C. Grace, Taylor Mill, KY (US)

(73) Assignee: FIVES MACHINING SYSTEMS, INC., Fond Du Lac, WI (US)

( * ) Notice: Subject to any disclaimer, the term of this patent is extended or adjusted under 35 U.S.C. 154(b) by 1637 days.

(21) Appl. No.: 17/012,488

(22) PCT Filed: Sep. 4, 2020

(86) PCT No.: PCT/US2020/049354

§ 371 (c)(1),  
(2) Date: Sep. 4, 2020

(87) PCT Pub. No.: WO2022/050950

PCT Pub. Date: Mar. 10, 2022

(65) Prior Publication Data

US 2022/0396040 A1     Dec. 15, 2022

(51) Int. Cl.  
B29C 70/38 (2006.01)  
B29C 70/54 (2006.01)  
B29K 105/08 (2006.01)

(52) U.S. Cl.  
CPC .......... B29C 70/388 (2013.01); B29C 70/541 (2013.01); *B29K 2105/0872* (2013.01)

(58) Field of Classification Search  
CPC ...... B29C 70/388; B29C 70/30; B29C 70/545  
(Continued)

(56) References Cited

U.S. PATENT DOCUMENTS

| | | |
|---|---|---|
| 4,419,170 A | 12/1983 | Blad |
| 4,750,965 A | 6/1988 | Pippel et al. |

(Continued)

FOREIGN PATENT DOCUMENTS

| | | |
|---|---|---|
| CN | 101941294 A | 1/2011 |
| CN | 102529114 A | 7/2012 |

(Continued)

OTHER PUBLICATIONS

International Search Report for PCT/US2020/049354 filed on Sep. 4, 2020, mailed on May 28, 2021.

(Continued)

*Primary Examiner* — Xiao S Zhao  
*Assistant Examiner* — Nicholas J Chidiac  
(74) *Attorney, Agent, or Firm* — CUSHMAN PARTNERS, LLC

(57) ABSTRACT

A fiber placement head for applying a plurality of composite tape segments on a mold includes a supply roll for storing and supplying composite tape having a backing film to the fiber placement head; a film roll for receiving the backing film from the composite tape that is removed from the film roll; an electric motor that rotates the supply roll or the film roll; and a slip clutch, coupled with the supply roll or the film roll, that permits the relative displacement of the angular position of the film roll with respect to the angular position of the supply roll.

6 Claims, 5 Drawing Sheets

(58) Field of Classification Search

USPC .......................................... 156/510; 425/110
See application file for complete search history.

(56) References Cited

U.S. PATENT DOCUMENTS

| | | | | |
|---|---|---|---|---|
| 4,867,833 | A | * | 9/1989 | McCoy ..................... B65C 9/42 |
| | | | | 156/542 |
| 5,056,996 | A | * | 10/1991 | Papastavros .......... B29C 70/504 |
| | | | | 264/40.7 |
| 5,431,749 | A | | 7/1995 | Messner |
| 5,472,553 | A | | 12/1995 | Roberts |
| 7,435,947 | B2 | * | 10/2008 | Engelbart ............. B29C 70/384 |
| | | | | 250/559.01 |
| 7,748,425 | B2 | * | 7/2010 | Tingley .................. B65H 49/18 |
| | | | | 156/425 |
| 8,147,637 | B2 | | 4/2012 | Kisch et al. |
| 8,733,417 | B2 | | 5/2014 | Hamlyn et al. |
| 8,997,818 | B2 | * | 4/2015 | Vaniglia ................. B29C 70/30 |
| | | | | 156/425 |
| 9,109,312 | B2 | | 8/2015 | Torres Martinez |
| 10,000,357 | B2 | * | 6/2018 | Brockman ............. B65H 59/36 |
| 2005/0061422 | A1 | | 3/2005 | Martin |
| 2006/0118244 | A1 | | 6/2006 | Zaballos et al. |
| 2007/0044900 | A1 | * | 3/2007 | Tingley ................ B29C 70/382 |
| | | | | 156/169 |
| 2007/0096019 | A1 | * | 5/2007 | Engelbart ............. B29C 70/384 |
| | | | | 250/231.15 |
| 2011/0192545 | A1 | | 8/2011 | McCowin et al. |
| 2014/0238612 | A1 | * | 8/2014 | Vaniglia ............... B29C 70/545 |
| | | | | 156/510 |
| 2017/0101286 | A1 | * | 4/2017 | Brockman .......... B65H 59/043 |
| 2020/0215767 | A1 | | 7/2020 | Danninger |

FOREIGN PATENT DOCUMENTS

| | | | |
|---|---|---|---|
| CN | 103180126 | A | 6/2013 |
| DE | 102014016404 | B4 | 5/2019 |
| EP | 1838505 | A1 | 10/2007 |
| GB | 2101519 | B | 3/1986 |
| JP | 2008529847 | A | 8/2008 |
| WO | WO2006088851 | A1 | 8/2006 |
| WO | WO2016198755 | A1 | 12/2016 |

OTHER PUBLICATIONS

International Preliminary Report on Patentability for International Application No. PCT/US2020/049354 dated Mar. 7, 2023 (6 pages).
Chinese Office Action for Chinese Application No. 202080103798.6 dated Oct. 31, 2024 (6 pages).
Search Report for Chinese Application No. 2020801037986 dated Oct. 31, 2024 (3 pages).
Japanese Office Action for Japanese Patent Application No. 2023-514921 dated Jul. 29, 2024 (4 pages).
English translation of Japanese Office Action for Japanese Patent Application No. 2023-514921 dated Jul. 29, 2024 (5 pages).
European Search Report for European Patent Application No. 20 952 645.8 dated May 7, 2024 (6 pages).

\* cited by examiner

FIBER PLACEMENT MACHINE WITH COMPOSITE TAPE FILM REMOVAL

TECHNICAL FIELD

The present application relates to fiber placement machines and, more particularly, to a fiber placement head that effectively manages removing film from composite tape.

BACKGROUND

Fiber placement machines are used to create composite workpieces. Composite material, in the form of fibrous material impregnated with resin, is applied by the machines to a mold or mandrel at precise locations and lengths to collectively form a composite workpiece. The fiber placement machine moves a fiber placement head over the mold to precisely apply composite tape in the ultimate shape of the composite workpiece. As the fiber placement head moves, it leaves a plurality of composite tape segments, also referred to as a course, or tows, behind on the mold. While a plurality of composite tape strands can be simultaneously applied as part of the course, the fiber placement head can individually control each of the tows as part of applying the course. The automatic application of these composite tape segments to the mold involves the cooperation of a diverse collection of machinery that holds, moves, and ultimately cuts the composite tape.

Composite fiber tape used by the fiber placement machine can be impregnated with a resin that is activated by heat applied after or during application to the mold. The composite fiber tape can be packaged on a roll or tube so that the tape exists wound around the roll or tube until it is needed. Then, an end of the tape is fed into the fiber placement machine, which pulls the composite fiber tape from the roll/tube. However, the resin pre-impregnated into composite fiber tape can be somewhat sticky so a film—sometimes referred to as a plastic interleave—can be positioned on a side of the tape so that when the tape is stored on the tube/spool, one section of the composite fiber tape does not touch another section of the tape. This arrangement can prevent sections of the composite fiber tape from unintentionally attaching to each other. Before application to the form or mandrel, the film is removed from the tape. It is helpful to manage this film as it is removed from the composite fiber tape applied to the mold/mandrel.

SUMMARY

In one implementation, a fiber placement head for applying a plurality of composite tape segments on a mold includes a supply roll for storing and supplying composite tape having a backing film to the fiber placement head; a film roll for receiving the backing film from the composite tape that is removed from the film roll; an electric motor that rotates the supply roll or the film roll; and a slip clutch, coupled with the supply roll or the film roll, that permits the relative displacement of the angular position of the film roll with respect to the angular position of the supply roll.

DETAILED DESCRIPTION

A fiber placement machine can include a fiber placement head that carries one or more spools of composite tape supplied for application on a mold. Many composite tape segments can be applied to the mold and collectively form a composite part. As composite tape is supplied from the spool(s), the backing film (plastic interleave) can be removed from the tape. A supply spindle can carry the supply spool and a separate film spool carried by a film spindle can receive backing film removed from the composite tape as the tape is pulled from the supply spool. The film spindle can be connected to an electric motor that rotates the film spindle and assists with maintaining tension on the backing film that is collected by the film spool. Initially, when a supply spool of composite tape includes a starting amount of tape, it exists at an initial diameter. As the composite tape is removed from the supply spool and backing film is accepted by the film spindle the diameter of the supply spool decreases and the diameter of the film spool increases. The changing diameters of the supply spool and the spindle spool can vary the diameter ratio of these spools. A slip clutch can be coupled with the supply spindle or the film spindle such that the electric motor rotating the film spindle can rotate at an angular velocity that is greater than the supply spindle and the film spindle thereby maintaining tension on the composite tape and backing film as it is removed from the tape.

Figure 1:
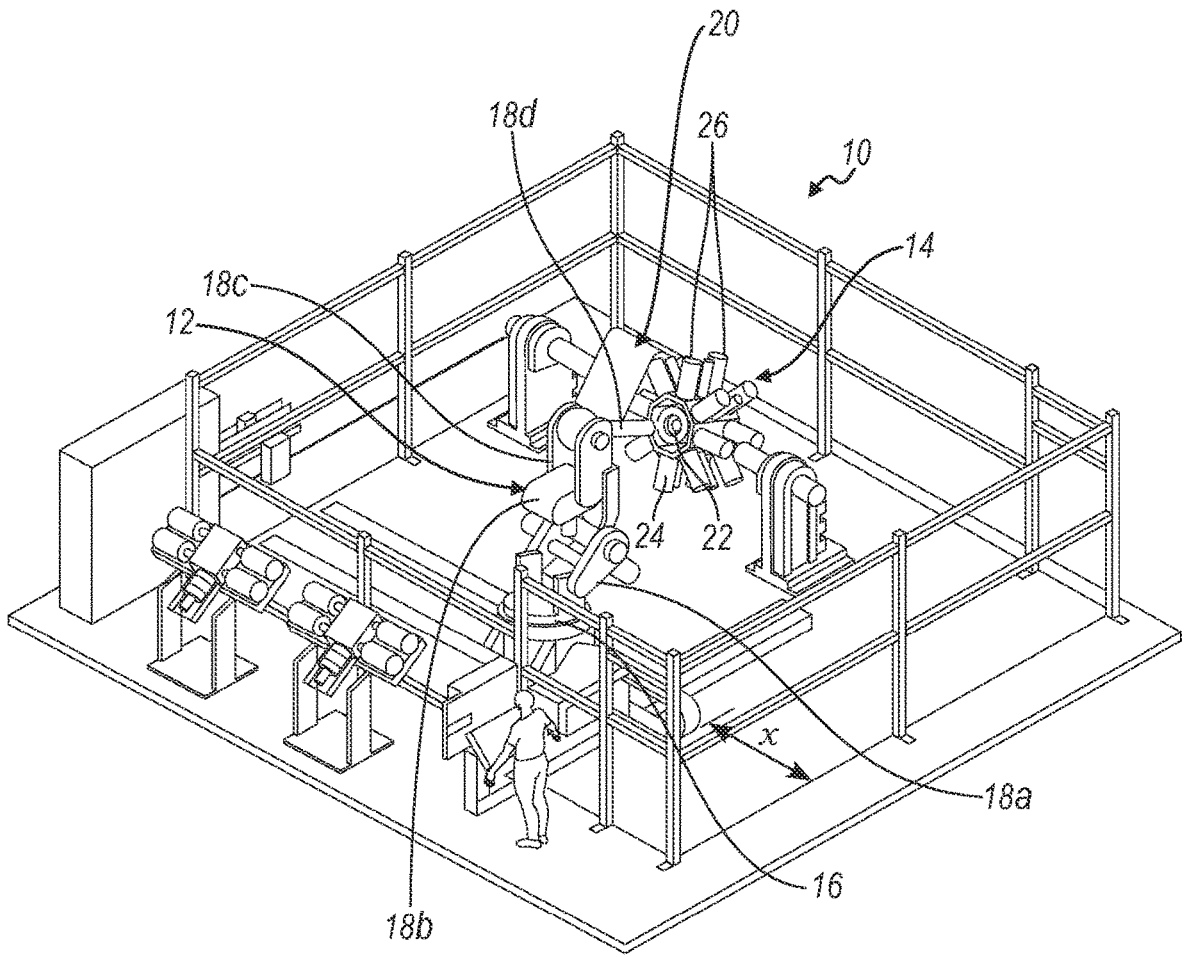
FIG. 1 is a perspective view depicting an implementation of a fiber placement machine.
Figure 2:
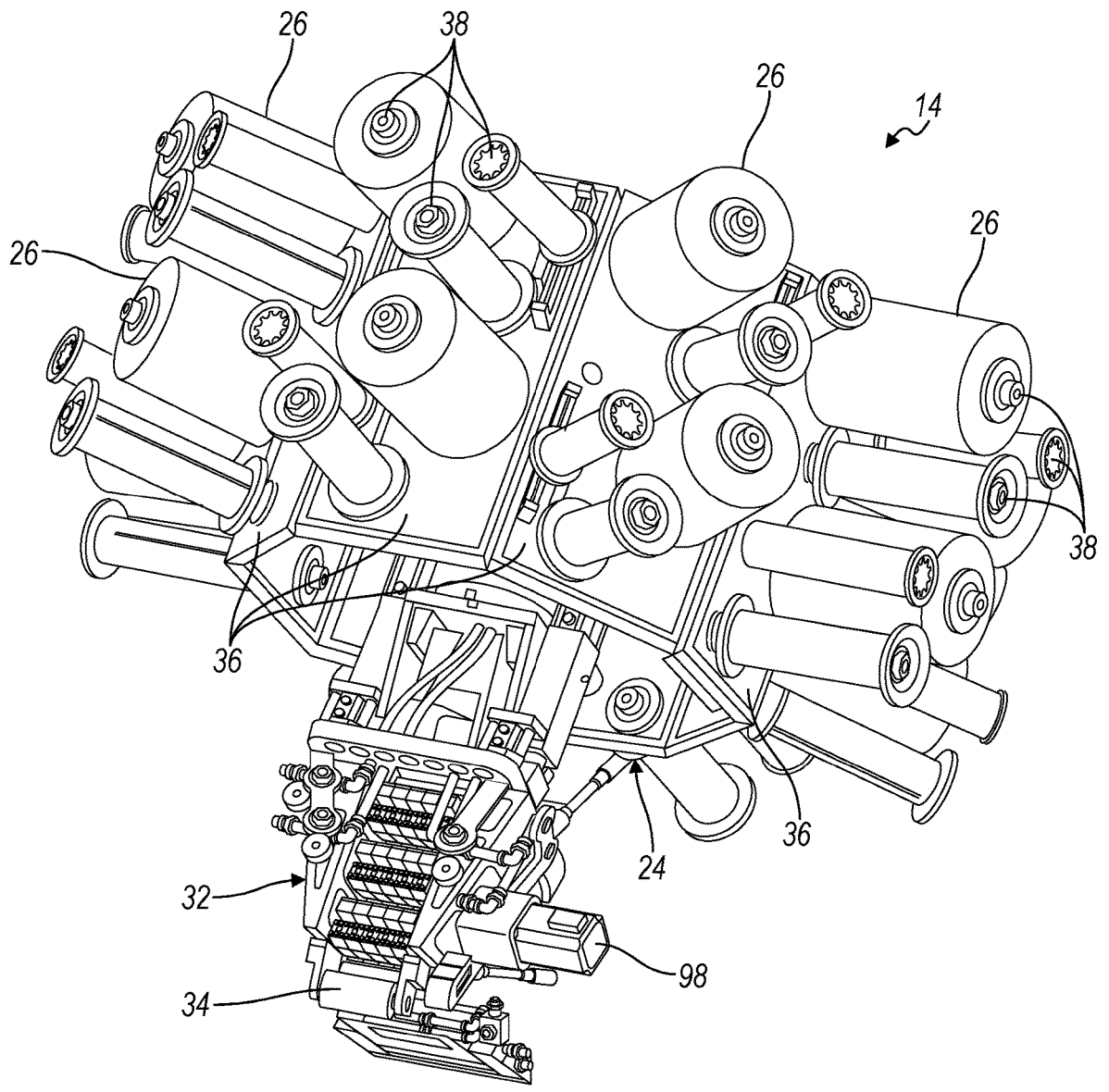
FIG. 2 is another perspective view depicting an implementation of a fiber placement head.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece.

A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory.

Communications between the mechanism that moves the robotic arm, such as the fluidic rams or electric motors, and the microprocessor can be carried out over a communications bus.

The robotic arm 12 can move the fiber placement head 14 along three axes to position the head 14 for service or to apply composite tape to the mold 20. While this is one implementation of a robotic arm 12 that can be used with a fiber placement head, other implementations of robotic arms or mechanical devices that apply composite tape can be used as well. The end of the robotic arm 12 distal to the base 16 can include a chuck 22 that releasably engages the fiber placement head 14. The chuck 22 and a portion of the fiber placement head 14 can have corresponding features such that the chuck 22 can releasably grab the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12.

As shown in FIGS. 2-6, the fiber placement head 14 can include a creel frame 24, a plurality of spools 26 that carry composite tape as a source of this tape for the head 14, and a cut, clamp, restart (CCR) assembly 32. The CCR assembly 32 can include a compaction roller 34 (or alternatively a compaction slide) that can receive the composite tape from the spools 26 and apply it to the mold 20 to create a composite part. The creel frame 24 includes a plurality of outer surfaces 36 and spindles 38 mounted orthogonally relative to the outer surfaces 36. The spindles 38 can, in some implementations, be moved to create tape tension using dancer elements controlled pneumatically, mechanically, or fluidically that help maintain tension on the composite tape as the tape is applied to the mold 20. More specifically, as shown in FIGS. 3-6, the fiber placement head 14 can include a supply spool 26a and a film spool 26b carried by a supply spindle 38a and a film spindle 38b, respectively. A dancer roll 28 can also be carried by the fiber placement head 14 to help manage the tension of composite tape as it is unwound from the supply spool 26a. In one implementation, the dancer roll 28 can move along a linear slide 29 in response to force provided by a dancer arm 30. This will be discussed in more detail below. The composite tape can unwind from the supply spool 26a, travel over the dancer roll 28 to the film spool 26b where the backing film is gathered, and into the compaction roller 34 for ultimate application to the mold 20.

Figures 3, 4:
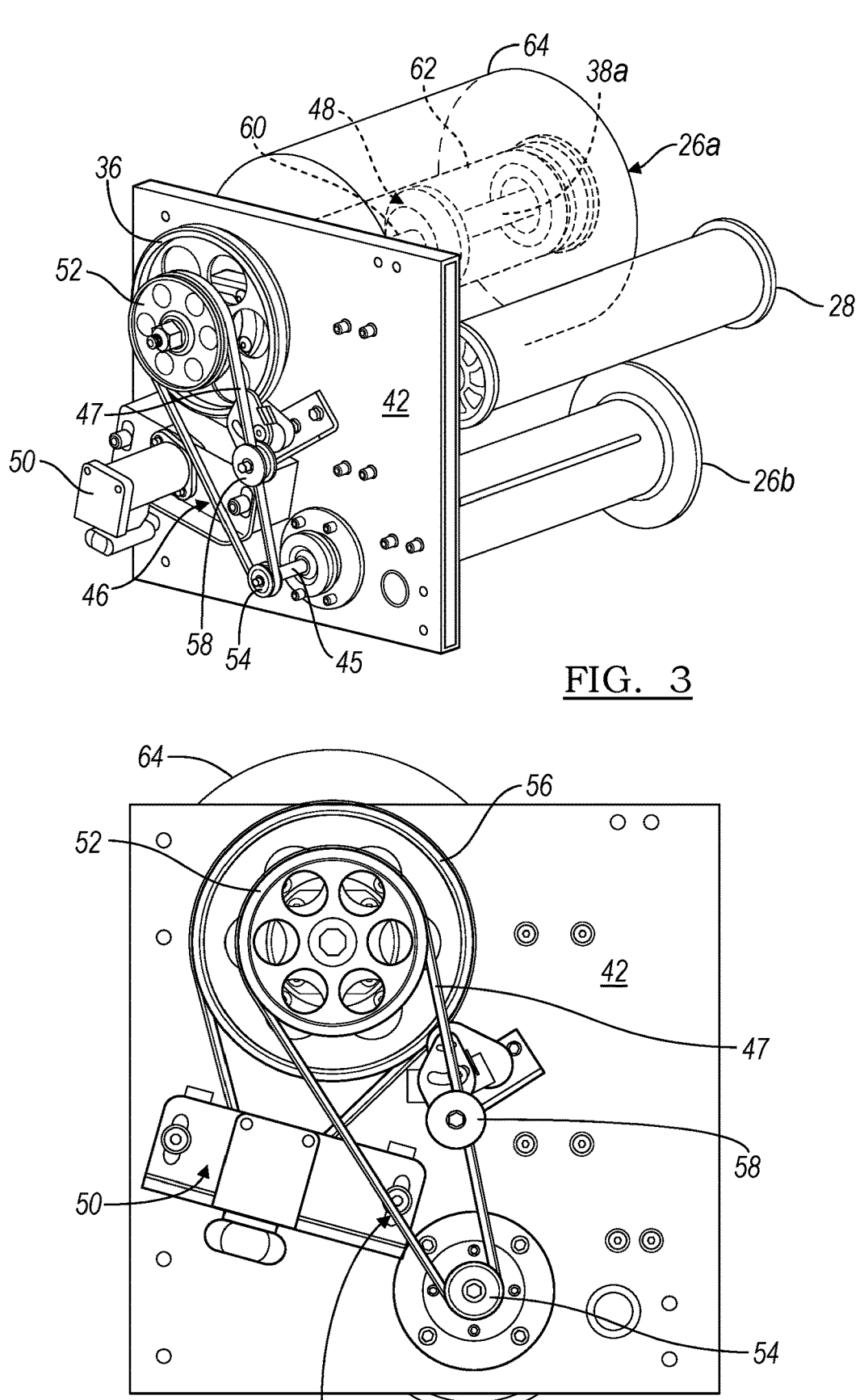
FIG. 3 is a perspective view depicting an implementation of a portion of a fiber placement head.
FIG. 4 is a profile view depicting an implementation of a portion of a fiber placement head.
Figure 5:
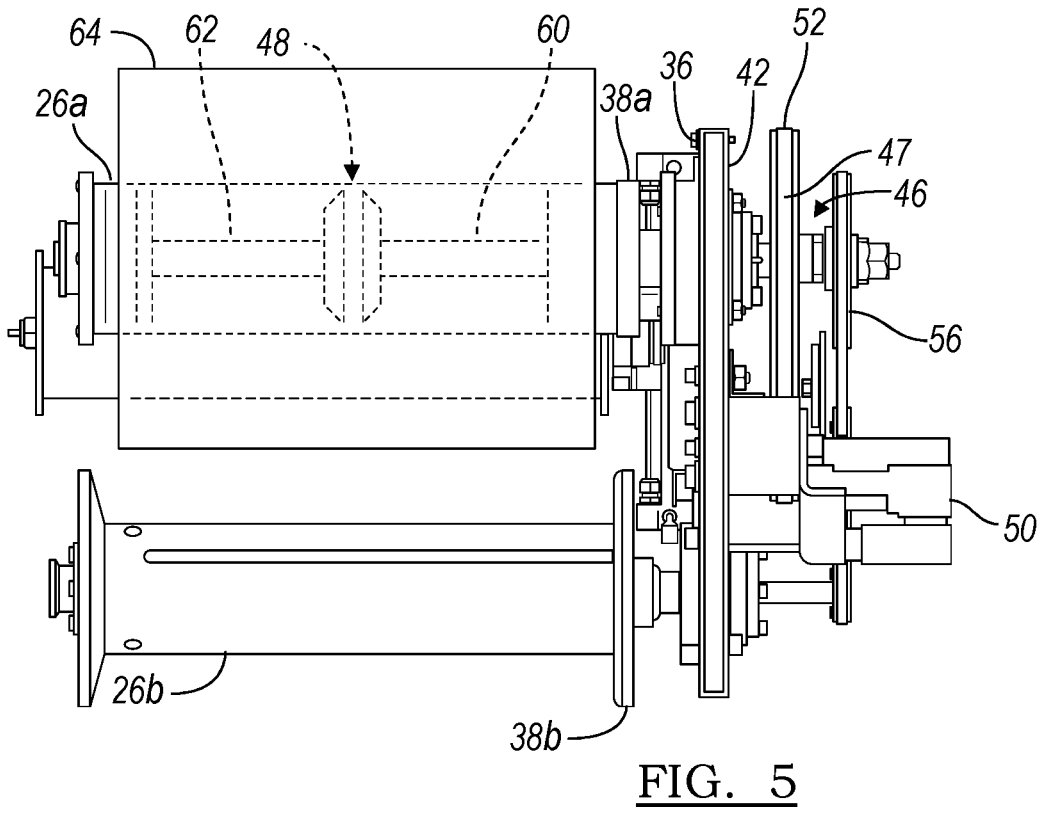
FIG. 5 is another perspective view depicting an implementation of a portion of a fiber placement head.
Figure 6:
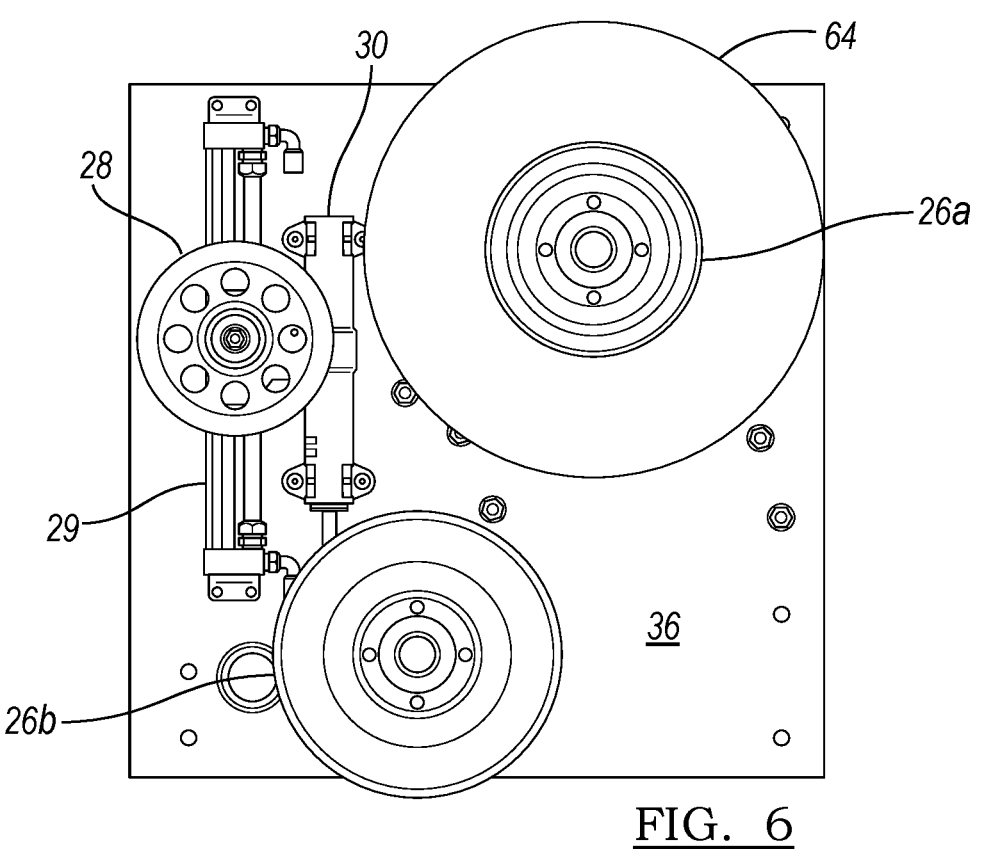
FIG. 6 is another perspective view depicting an implementation of a portion of a fiber placement head.

A portion of an inner surface 42 of the fiber placement head 14 is shown in FIGS. 3-4. A number of components included with the fiber placement head 14 are shown proximate to the inner surface 42. For example, the fiber placement head 14 can include a rotational drive 46 mechanically connecting the film spindle 38b to the supply spindle 38a and a supply spool tensioner 50. The supply spool tensioner 50 can include an electric motor to rotate the supply spindle 38a. In this implementation, the rotational drive 46 can include an endless loop 47, such as a belt or chain, that engages both a film pulley 54 attached to an output shaft 45 of the film spool 26b as well as a supply pulley 52 ultimately coupled to the supply spindle 38a via a slip clutch 48. In some implementations the slip clutch 48 can be located adjacent an axial end of the supply spool 26a yet in other implementations the clutch 48 can be located radially-inward of the composite material carried by the supply spool 26a. The diameters of the supply pulley 52 and the film pulley 54 can be chosen to maintain a particular ratio. This will be discussed below in more detail. The film pulley 54 and the supply pulley 52 can include a grooved axial outer surface for receiving a correspondingly shaped endless loop such that increased tension correspondingly increases friction between the endless loop 47 and the pulleys 52, 54. Or in another implementation, the pulleys 52, 54 can include radially-outwardly facing teeth that engage an endless loop implemented as a chain. Tension on the endless loop can be maintained using a dancer idler 58 that includes an idler pulley biased into contact with the endless loop. However, other implementations are possible in which the rotational drive is implemented as a geared connection between the output shaft 45 and the supply spindle 38a. In this implementation, the supply spool tensioner 50 can maintain a defined level of torsional resistance on the supply spindle 38a. The supply spool tensioner 50 can include a servomotor having an output coupled with the endless loop 47 that engages a tension pulley 56 attached to an end of the supply spindle 38a. However, other implementations are possible in which the servomotor is axially aligned with the supply spindle 26a and include an inline gear reducer coaxial with the axis of spindle rotation.

The slip clutch 48 can include a clutch input 60 that couples with the supply pulley 52 and a clutch output 62 that engages and rotates with the supply spindle 38a. Below and up to and below a particular amount or level of torque applied to the clutch input 60, the clutch input 60 maintains a fixed angular position relative to the clutch output 62. Once the level of torque is exceeded, the slip clutch 48 permits the clutch input 60 to change angular position relative to the clutch output, thereby limiting the amount of torque that is communicated from the clutch input 60 to the clutch output 62. Slip clutches can be implemented in any one of a variety of ways and the amount of torque at which angular displacement occurs can be selected. For example, one or more friction pads can be positioned along the axis of rotation in between the clutch input 60 and the clutch output 62. The clutch input 60 and clutch output 62 can couple with opposite ends of the friction pads. In some implementations, an axial screw used with a collar can be used to increase or decrease the pressure of the friction pads against each other thereby increasing or decreasing the torque value at which the clutch output 62 is angularly displaced relative to the clutch input 60. The ratio of the diameter of the supply pulley 52 to the diameter of the film pulley 54 can be chosen so that, while the electric motor is operating, the clutch input 60 is angularly displaced relative to the clutch output 62, regardless of whether the supply spool 26a exists at an initial state (initial diameter), fully wound with composite tape, or whether the supply spool 26a exists at a depleted state, with a significant amount of backing film wound around the film spindle 38b.

Figure 7:
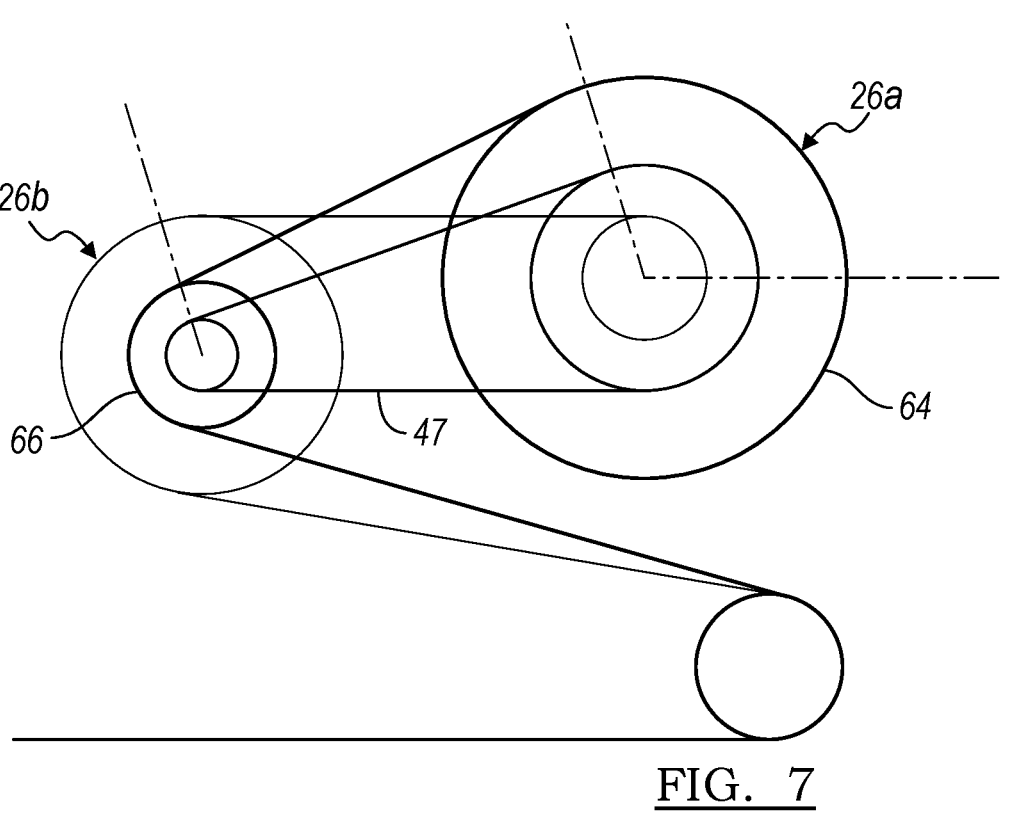
FIG. 7 is a profile view depicting an implementation of a portion of a fiber placement head.
Figure 8:
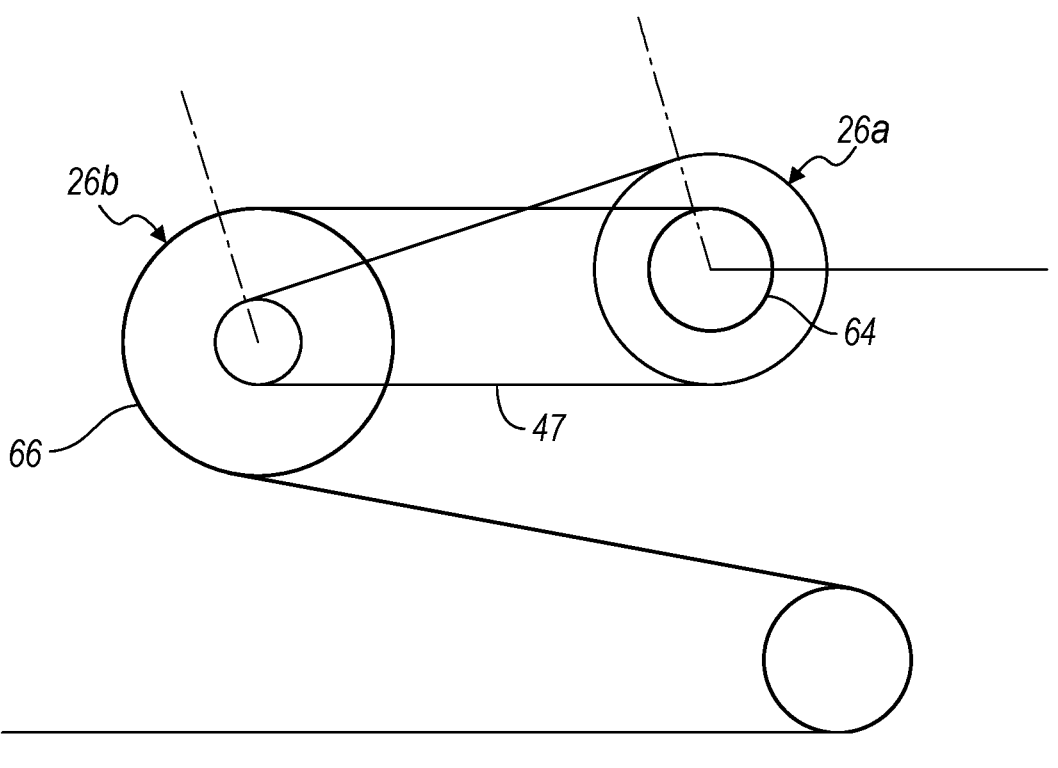
FIG. 8 is a profile view depicting an implementation of a portion of a fiber placement head.

Turning to FIG. 7, a profile view of an implementation of a supply spool 26a in an initial state is shown and in FIG. 8 a profile view of an implementation of a supply spool 26a in a depleted state. In FIG. 7, the supply spool 26a is wound to full capacity with composite tape 64. In this implementation, the supply spool 26a at full capacity can have a diameter of 8 inches and the film spool 26b can have a diameter of 2.5 inches when empty or nearly so. Given an angular velocity of the output shaft 45, the ratio between the supply spool 26a at full capacity and the empty film spool 26b is 3.2:1. As the composite tape 64 is supplied to the fiber placement head 14 and deposited on the mold 20, the diameter of the supply spool 26a reduces while the diameter of the film spool 26b increases as the film spool 26b accepts backing film 66 removed from composite tape 64. When the composite tape 64 has been removed from the supply spool 26b and backing film 66 from the removed tape 64 is wound around the film spool 26b, the diameter of the supply spool 26a is 3 inches while the diameter of the film spool 26b is 6.5 inches; the ratio between the depleted supply spool relative to the film spool filled with backing tape 66 is 1:2.2. The electric motor can rotate the supply pulley 52 relative to the film pulley 54 at an angular velocity such that, in one embodiment, a 4:1 ratio is present so that regardless of the changing diameters of the supply spool 26a and the film spool 26b, the supply spindle 38a can be overdriven so that the clutch input 60 is angularly displaced relative to the clutch output 62 thereby maintaining tension of the backing film 66 as it is removed from the composite tape 64. At an output shaft angular rotation rate of 2,400 revolutions per minute (RPM), the supply spool 26a can rotate at an angular rotation rate of 95.5 RPM and the film spool 26b can rotate at an angular rotation rate of 306 RPM. After all or nearly all of the composite tape 64 is pulled from the supply spool 26a, the supply spool 26a can rotate at an angular rotation rate of 241 RPM and the film spool can rotate at an angular rotation rate of 118 RPM.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fiber placement head for applying a plurality of composite tape segments on a mold, comprising:
   a supply roll, mounted on a spool carried by a creel frame of the fiber placement head, for storing and supplying composite tape having a backing film to the fiber placement head;
   a film roll, mounted on another spool carried by the creel frame of the fiber placement head for receiving the backing film from the composite tape that is removed from the film roll;
   an electric motor that rotates the supply roll or the film roll; and
   a slip clutch, carried by the creel frame and coupled with the supply roll or the film roll, that permits the relative displacement of the angular position of the film roll with respect to the angular position of the supply roll in response to a changed diameter of the supply roll relative to a changed diameter of the film roll.

2. The fiber placement head recited in claim 1, further comprising a dancer roll that receives composite tape from the supply roll and communicates the tape over an outer surface of the film roll while maintaining tension on the composite tape.

3. The fiber placement head recited in claim 1, further comprising a film spindle, for carrying the film roll and receiving rotational input from the electric motor.

4. The fiber placement head recited in claim 1, further comprising a supply spindle, for carrying the supply roll and receiving rotational input from the electric motor.

5. The fiber placement head recited in claim 1, wherein a supply pulley is rotated relative to a film pulley at an angular velocity such that a 4:1 ratio is present so that regardless of the changing diameters of the supply spool and the film spool, the supply pulley can be overdriven.

6. The fiber placement head recited in claim 5, wherein the rotational drive comprises the supply pulley, the film pulley, and an endless loop.

* * * * *